US012282818B1

(12) United States Patent
Wijata et al.

(10) Patent No.: US 12,282,818 B1
(45) Date of Patent: Apr. 22, 2025

(54) METHODS, SYSTEMS, APPARATUSES, AND DEVICES FOR FACILITATING COMPLIANCE WITH REQUIREMENTS FOR USERS

(71) Applicants: Hadi T Wijata, Lathrop, CA (US); Veronica Chandra Kirana, Jakarta Pusat (ID); Rudi Hidayat, West Jakarta (ID)

(72) Inventors: Hadi T Wijata, Lathrop, CA (US); Veronica Chandra Kirana, Jakarta Pusat (ID); Rudi Hidayat, West Jakarta (ID)

( * ) Notice: Subject to any disclaimer, the term of this patent is extended or adjusted under 35 U.S.C. 154(b) by 0 days.

(21) Appl. No.: 18/736,329

(22) Filed: Jun. 6, 2024

(51) Int. Cl.
*G06K 7/00* (2006.01)
*G06K 19/077* (2006.01)

(52) U.S. Cl.
CPC ..... *G06K 19/07758* (2013.01); *G06K 7/0008* (2013.01)

(58) Field of Classification Search
CPC ............ G06K 19/07758; G06K 7/0008
USPC ........................................ 235/492
See application file for complete search history.

(56) References Cited

U.S. PATENT DOCUMENTS 9,020,831 B2 * 4/2015 Simske ............... H04L 67/535
705/7.27

* cited by examiner

*Primary Examiner* — Toan C Ly

(57) ABSTRACT

An apparatus for facilitating a compliance with requirements for users includes tags configured to be comprised in items. The tags are configured for establishing the compliance with a requirement for the user through a compliance monitoring device. The compliance monitoring device includes a detector configured for detecting the tags. The compliance monitoring device includes a processing device communicatively coupled with the detector. The processing device is configured for obtaining an identifier which is unique to each of the tags, obtaining a data, analyzing the data and the identifier of each of the tags based on the requirement, determining an anomaly in the establishing of the compliance with the requirement based on the analyzing, and generating a notification based on the determining. The compliance monitoring device includes a communication device communicatively coupled with the processing device. The communication device is configured for transmitting the notification to a device.

20 Claims, 16 Drawing Sheets

METHODS, SYSTEMS, APPARATUSES, AND DEVICES FOR FACILITATING COMPLIANCE WITH REQUIREMENTS FOR USERS

FIELD OF THE INVENTION

Generally, the present disclosure relates to the field of data processing. More specifically, the present disclosure relates to methods, systems, apparatuses, and devices for facilitating a compliance with requirements for users.

BACKGROUND OF THE INVENTION

The field of data processing is technologically important to several industries, business organizations, and/or individuals. In particular, the use of data processing is prevalent for facilitating a compliance with requirements for users.

The police departments of some countries and provinces started building electronic traffic law enforcement (ETLE) to reduce accidents and to fine people who broke the traffic rules. However, the implementation of electronic traffic law enforcement has some challenges such as counterfeit license plates on vehicles, tinting glass on windshields on cars or trucks, full face helmet on motorcycle, driver having no driver's license, counterfeit driver license, and counterfeit vehicle registration certificate.

The ETLE right now cannot detect whether the driver brought the driver's license and vehicle registration certificate when they are driving. The traffic rules in some countries state that all drivers who drive cars and motorcycles have to bring a driver's license, and vehicle registration certificate on the road. The existing driver license, vehicle registration certificate, and the motor vehicle owner's book cannot be detected by the ETLE.

Existing techniques for facilitating a compliance with requirements for users are deficient with regard to several aspects. For instance, current technologies do not detect the availability of items for complying with the requirements. As a result, different technology is needed to detect the availability of items. Furthermore, current technologies do not detect counterfeiting in items for enforcing compliance of the requirements. As a result, different technology is needed to detect counterfeiting in items. Moreover, current technologies do not verify authenticity of items. As a result, different technology is needed to verify the authenticity of items.

Therefore, there is a need for improved methods, systems, apparatuses, and devices for facilitating a compliance with requirements for users that may overcome one or more of the above-mentioned problems and/or limitations.

SUMMARY OF THE INVENTION

This summary is provided to introduce a selection of concepts in a simplified form that are further described below in the Detailed Description. This summary is not intended to identify key features or essential features of the claimed subject matter. Nor is this summary intended to be used to limit the claimed subject matter's scope.

Disclosed herein is an apparatus for facilitating a compliance with requirements for users, in accordance with some embodiments. Accordingly, the apparatus may include a plurality of tags. Further, the plurality of tags may be configured to be comprised in a plurality of items associated with a user. Further, the plurality of tags may be associated with a plurality of identifiers. Further, the plurality of tags may be configured for establishing the compliance with at least one requirement for the user through at least one compliance monitoring device. Further, the at least one compliance monitoring device may include at least one detector configured for detecting the plurality of tags. Further, the at least one compliance monitoring device may include a processing device communicatively coupled with the at least one detector. Further, the processing device may be configured for obtaining an identifier associated with each of the plurality of tags based on the detecting. Further, the identifier may be unique to each of the plurality of tags. Further, the processing device may be configured for obtaining at least one data. Further, the processing device may be configured for analyzing the at least one data and the identifier of each of the plurality of tags based on the at least one requirement. Further, the processing device may be configured for determining an anomaly in the establishing of the compliance with the at least one requirement based on the analyzing of the at least one data and the identifier. Further, the processing device may be configured for generating at least one notification based on the determining of the anomaly. Further, the at least one compliance monitoring device may include a communication device communicatively coupled with the processing device. Further, the communication device may be configured for transmitting the at least one notification to at least one device.

Further, disclosed herein is an apparatus for facilitating a compliance with requirements for users, in accordance with some embodiments. Accordingly, the apparatus may include a plurality of tags and at least one compliance monitoring device. Further, the plurality of tags may be configured to be comprised in a plurality of items associated with a user. Further, the plurality of tags may be associated with a plurality of identifiers. Further, the plurality of tags may be configured for establishing the compliance with at least one requirement for the user. Further, the at least one compliance monitoring device may include at least one detector configured for detecting the plurality of tags. Further, the at least one compliance monitoring device may include a processing device communicatively coupled with the at least one detector. Further, the processing device may be configured for obtaining an identifier associated with each of the plurality of tags based on the detecting. Further, the identifier may be unique to each of the plurality of tags. Further, the processing device may be configured for obtaining at least one data. Further, the processing device may be configured for analyzing the at least one data and the identifier of each of the plurality of tags based on the at least one requirement. Further, the processing device may be configured for determining an anomaly in the establishing of the compliance with the at least one requirement based on the analyzing of the at least one data and the identifier. Further, the processing device may be configured for generating at least one notification based on the determining of the anomaly. Further, the at least one compliance monitoring device may include a communication device communicatively coupled with the processing device. Further, the communication device may be configured for transmitting the at least one notification to at least one device.

Further, disclosed herein is an apparatus for facilitating a compliance with requirements for users, in accordance with some embodiments. Accordingly, the apparatus may include a plurality of tags and at least one compliance monitoring device. Further, the plurality of tags may be configured to be comprised in a plurality of items associated with a user. Further, the plurality of tags may be associated with a plurality of identifiers. Further, the plurality of tags may be configured for establishing the compliance with at least one requirement for the user. Further, each of the plurality of items may be a physical form of each of a plurality of documents associated with the user. Further, the establishing of the compliance may be based on the plurality of documents. Further, each of the plurality of items may include each of the plurality of tags. Further, the at least one compliance monitoring device may include at least one detector configured for detecting the plurality of tags. Further, the at least one compliance monitoring device may include a processing device communicatively coupled with the at least one detector. Further, the processing device may be configured for obtaining an identifier associated with each of the plurality of tags based on the detecting. Further, the identifier may be unique to each of the plurality of tags. Further, the processing device may be configured for obtaining at least one data. Further, the processing device may be configured for analyzing the at least one data and the identifier of each of the plurality of tags based on the at least one requirement. Further, the processing device may be configured for determining an anomaly in the establishing of the compliance with the at least one requirement based on the analyzing of the at least one data and the identifier. Further, the processing device may be configured for generating at least one notification based on the determining of the anomaly. Further, the at least one compliance monitoring device may include a communication device communicatively coupled with the processing device. Further, the communication device may be configured for transmitting the at least one notification to at least one device.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
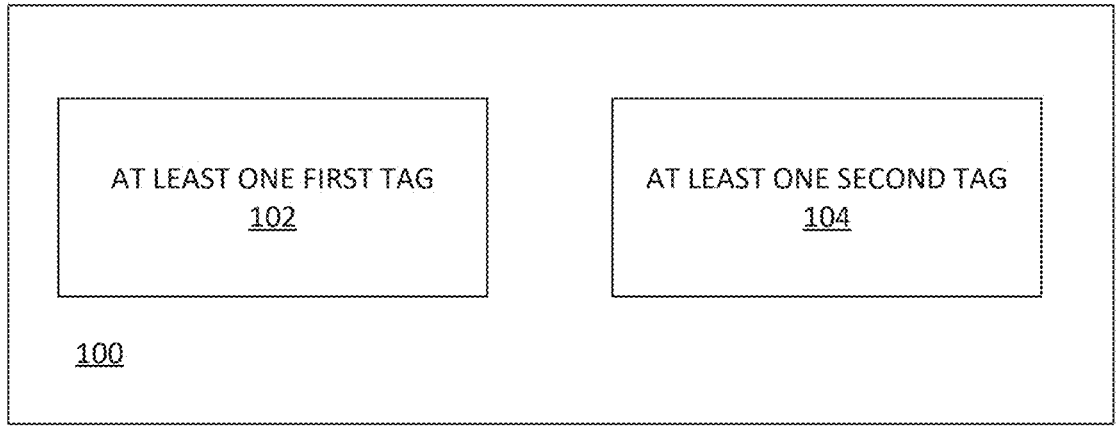
FIG. 1 is a block diagram of an apparatus 100 for facilitating a compliance with requirements for users, in accordance with some embodiments.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denote "at least one" but do not exclude a plurality unless the contextual use dictates otherwise. When used herein to join a list of items, "or" denotes "at least one of the items" but does not exclude a plurality of items of the list. Finally, when used herein to join a list of items, "and" denotes "all of the items of the list".

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating a compliance with requirements for users, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a rack server, a super-computer, a mainframe computer, mini-computer, micro-computer, a storage server, an application server (e.g., a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g., Windows, Mac OS, Unix, Linux, Android, etc.) in order to provide a user interface (e.g., GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data finger-printing, role-based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g., username, password, passphrase, PIN, secret question, secret answer, etc.) and/or possession of a machine readable secret data (e.g., encryption key, decryption key, bar codes, etc.) and/or or possession of one or more embodied characteristics unique to the user (e.g., biometric variables such as, but not limited to, fingerprint, palm-print, voice characteristics, behavioral characteristics, facial features, iris pattern, heart rate variability, evoked potentials, brain waves, and so on) and/or possession of a unique device (e.g., a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g., transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g., the server computer, a client device, etc.) corresponding to the performance of the one or more steps, environmental variables (e.g., temperature, humidity, pressure, wind speed, lighting, sound, etc.) associated with a device corresponding to the performance of the one or more steps, physical state and/or physiological state and/or psychological state of the user, physical state (e.g., motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g., a real-time clock), a location sensor (e.g., a GPS receiver, a GLONASS receiver, an indoor location sensor, etc.), a biometric sensor (e.g., a fingerprint sensor), an environmental variable sensor (e.g., temperature sensor, humidity sensor, pressure sensor, etc.) and a device state sensor (e.g., a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g., initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes methods, systems, apparatuses, and devices for facilitating compliance with requirements for users.

Further, the present disclosure describes an inclusion of RFID technology in driver's licenses, vehicle registration certificates, license plates, and motor vehicle owner's books/cards. Further, the driver's licenses, vehicle registration certificates, and license plates can be detected by electronic traffic law enforcement (ETLE), but the motor vehicle owner's book/cards cannot be detected by the ETLE. The RFID can help the electronic traffic law enforcement to detect the required items.

Further, the present disclosure describes usage of RFID on license plates, RFID on driver's licenses, vehicle registration certificates, and Motor Vehicle Owner's Book.

All the RFID license plates, driver's licenses, and vehicle registration certificates cannot be cloned because they have differentiated chips from each other. The system utilizes tiny differences in the chips themselves to create a unique identifier (the RFID tags have unique serial numbers).

Further, the present disclosure describes the usage of RFID technology in readers and tags. The readers may be a component of an ETLE system or RFID guns used by police.

The tags can be active, passive, or semi-passive. The operational frequency of the RFID may be low frequency (LF) 125 kHz to 134 kHz, high frequency (HF) 13.56 MHz, and Ultra High frequency (UHF) 860 to 960 MHz.

Further, the present disclosure describes the usage of active RFID tags that have a battery in the license plate, and the ETLE system can detect them from 100-150 meters. In cars or vehicles with 4 wheels and up, the size of the license plate may be 430 mm×135 mm (16.9 inches×5.3 inches). The size of a license plate in a motorcycle may be "27 mm×115 mm" or "10.8 inches×4.5 inches". The battery used in active RFID tags may work for 5 years.

Further, the present disclosure describes the usage of passive RFID tags in the driver's license. The size of the driver's license may be 85.6 mm×54 mm or "3.375 inches× 2.125 inches". These passive RFID tags work on Ultra High Frequency and may be boosted with an external battery.

Further, the present disclosure describes the usage of the passive RFID tags in the vehicle registration certificate. The size of the Vehicle registration certificate is the same as the driver's license which is "3.375 inches×2.125 inches". These RFID tags work on Ultra High Frequency and can be boosted with an external battery.

Further, the present disclosure describes the usage of passive RFID tags in the motor vehicle owner's book and the size of the motor vehicle owner's book is the same as the driver's license which is "3.375 inches×2.125 inches".

Further, the present disclosure describes that the active RFID tags of the License plate, passive RFID tags of the driver's license, and passive RFID tags of the vehicle registration certificate, these 3 items can be detected by the ETLE system or by a gun scanner of the police officer (patrol police) on duty. The driver never carries a "motor vehicle book". This book, which proves ownership vehicle, is not for tag detection by the ETLE. The motor vehicle owner's book with a passive RFID tag can be detected only by the police department traffic center.

Further, the present disclosure describes that both the driver's license and the vehicle registration certificate can connect to a tool that can be put on the windshield for a car or put on a helmet for a motorcycle. The current driver's license should be replaced with the driver's license with the RFID tag. The vehicle registration certificate needs to be replaced with a vehicle registration certificate card with an RFID tag. Both the driver's license and the vehicle registration certificate will be used for enforcement in the ETLE system, and the vehicle ownership title needs to be replaced with a card with a RFID tag. Further, the ownership title is not for enforcement in the ETLE system but can only be checked by the police department traffic center for ownership of that vehicle.

Further, the present disclosure describes that the license plate and e-toll use active RFID tags with ultra-high frequencies that use battery and can be scanned from a distance of 150 meters and build an accurate real-time location system (RTLS). The driver's license and vehicle registration certificate use passive RFID tags and operates on UHF and the toll has a battery to boost the signal to the reader.

Further, the present disclosure describes the use of the driver's license, the vehicle registration certificate, and the license plate. Further, the driver's license may be a card with a size "33/8 inches×21/8 inches" using passive RFID tags with UHF and may be boosted by an external battery. The vehicle registration certificate may be printed paper that may be changed to a passive RFID tag that uses UHF and may be boosted by an external battery. Further, the license plate is for vehicles with 4 wheels and up and may be of size 43 cm length and 13.5 cm width, or "16.92 (inches) length, 5.31 (inches) width", and include the active RFID tag. Further, the RFID tag has a battery that can be used for 5 years. Further, the license plate for motorcycles may be of the size 27.5 cm in length and 11 cm in width, or "10.83 inches in length and 4.33 inches in width". The license plate uses active RFID tags which have a battery that can be used for 5 years. The Vehicle ownership proof may be changed to a card with a passive RFID tag that the police officer of the police department traffic center can check to ascertain the owner of the vehicle. The driver's license and the vehicle registration certificate using passive RFID tags may be put together on the windshield of the car or vehicle with 4 wheels or up or they may be put together on the helmet for motorcycles. These tags may be boosted by an external battery. Driver licenses, vehicle registration certificates, and license plates have RFID tags on them. The ETLE (Electronic Traffic Law Enforcement) system or police officer of law enforcement has the reader of the RFID tags. With this technology, the license plate, driver's license, and vehicle registration certificate can be detected very fast. Further, the ETLE system may assign the reader for RFID tags so that the reader may check the vehicle license plate, driver's license, and vehicle registration certificate all at the same time. The RFID reader may read all the tags because the reader has special anti-collision algorithms that enable "singulating" on specific tags. All the RFID readers on the ETLE system may communicate with the central server to check the validity of all RFID tags. Further, the RFID tags may not be cloned because the chips comprised in the RFID tags are unique and may be differentiated from each other. The system utilizes tiny differences in the chips to create a unique identifier (The RFID tags have unique serial numbers).

Further, the present disclosure describes that the license plate car (4 wheels up) and license plate motorcycles or 3 wheelers uses RFID tags of Ultra High Frequency with the battery (RFID active). Driver license and vehicle registration certificate, both use RFID tags with UHF (RFID passive tags). Both the driver license and vehicle registration certificate connect with battery boaster become semi passive RFID tags. Both the driver license and vehicle registration certificate may be put on windshield on car or put on helmet on motorcycle driver. The title ownership of vehicle uses RFID passive tags only. Further, license plate with RFID tag, driver license with RFID tag, and vehicle registrations certificate with RFID tag may be detected on the RFID reader associated with ETLE (electronic traffic law enforcement) system.

FIG. 1 is a block diagram of an apparatus 100 for facilitating a compliance with requirements for users, in accordance with some embodiments. Accordingly, the apparatus 100 may include a plurality of tags 102-104.

Figure 9:
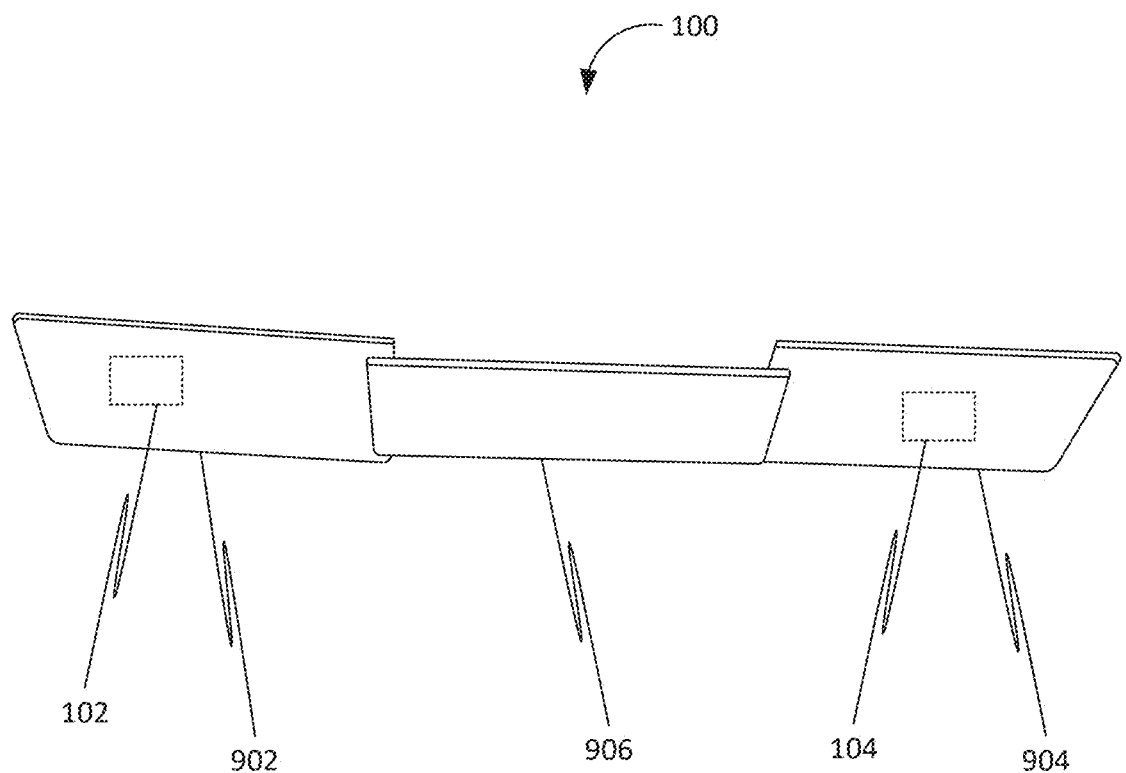
FIG. 9 is a bottom perspective view of the apparatus 100 with at least one holder 906, in accordance with some embodiments.

Further, the plurality of tags 102-104 may be configured to be comprised in a plurality of items 902-904, as shown in FIG. 9, associated with a user. Further, the user may be an individual driving at least one vehicle (such as a car, a motorcycle, etc.). Further, the plurality of tags 102-104 may include radio frequency identification (RFID) tags, near field communication (NFC) tags, etc. Further, the plurality of items 902-904 may include a driving license, a vehicle registration book, a vehicle registration certificate, a license plate, documents, etc. Further, the plurality of items 902-904 may be associated with the at least one vehicle. Further, the plurality of tags 102-104 may include at least one first tag 102 and at least one second tag 104. Further, the at least one first tag 102 may be associated with the license plate.

Further, the at least one first tag 102 may include a license plate tag. Further, the at least one second tag 104 may be associated with the vehicle registration certificate and the driving license. Further, the at least one second tag 104 may include a vehicle registration certificate tag and a driving license tag. Further, the plurality of tags 102-104 may be associated with a plurality of identifiers. Further, the plurality of identifiers may include a series of numbers, a series of alphabets, an alphanumeric code, a number of characters, etc. Further, the plurality of tags 102-104 may be configured for establishing the compliance with at least one requirement for the user through at least one compliance monitoring device 202, shown in FIG. 2. Further, the at least one compliance monitoring device 202 may be associated with an ELTE system, a server, etc. Further, the at least one requirement may include an availability of the plurality of items 902-904 with the user while driving the at least one vehicle, an authenticity of the plurality of items 902-904, a validity of the plurality of items 902-904, etc. Further, the at least one compliance monitoring device 202 may include at least one detector 302, a processing device 304, and a communication device 306, as shown in FIG. 3. Further, the at least one compliance monitoring device 202 may include a computing device, a personal computer (PC), a desktop, a smartphone, a computer, a client device, a Radio Frequency Identification (RFID) reader device, a Radio Frequency Identification (RFID) gun, etc. Further, the at least one detector 302 may include a Radio Frequency Identification (RFID) reader, a near field communication (NFC) reader, etc. Further, the at least one detector 302 may be configured for detecting the plurality of tags 102-104. Further, the processing device 304 may be communicatively coupled with the at least one detector 302. Further, the processing device 304 may include a computer, a smartphone, a server, etc. Further, the processing device 304 may be configured for obtaining an identifier associated with each of the plurality of tags 102-104 based on the detecting. Further, the identifier may include a series of numbers, a series of alphabets, an alphanumeric code, a number of characters, etc. Further, the identifier may be unique to each of the plurality of tags 102-104. Further, the processing device 304 may be configured for obtaining at least one data. Further, the at least one data may include an information on a list of vehicle licenses issued by an authority, a list of individuals with licenses, a list of registered vehicles, a list of owners of registered vehicles, a list of license plates number, a list of owners and vehicles associated with license plate numbers, a list of identifiers associated with each of the vehicle licenses, the registered vehicles, and the license plates numbers, etc. Further, the processing device 304 may be configured for analyzing the at least one data and the identifier of each of the plurality of tags 102-104 based on the at least one requirement. Further, the processing device 304 may be configured for determining an anomaly in the establishing of the compliance with the at least one requirement based on the analyzing of the at least one data and the identifier. Further, the anomaly may include an absence of at least one of the plurality of tags 102-104, a mismatch in the at least one data and the identifier, an inaccurate validity of the plurality of tags 102-104, etc. Further, the processing device 304 may be configured for generating at least one notification based on the determining of the anomaly. Further, the at least one notification may include an alert for counterfeit documents, an alert for unavailability of documents, an indication of legit documents, etc. Further, the communication device 306 may be communicatively coupled with the processing device 304. Further, the communication device 306 may include a transceiver, a communication interface, a network interface, etc. Further, the communication device 306 may be configured for transmitting the at least one notification to at least one device 308, as shown in FIG. 3. Further, the at least one device 308 may include a computing device, a client device, an input device, an output device, etc.

Figure 4:
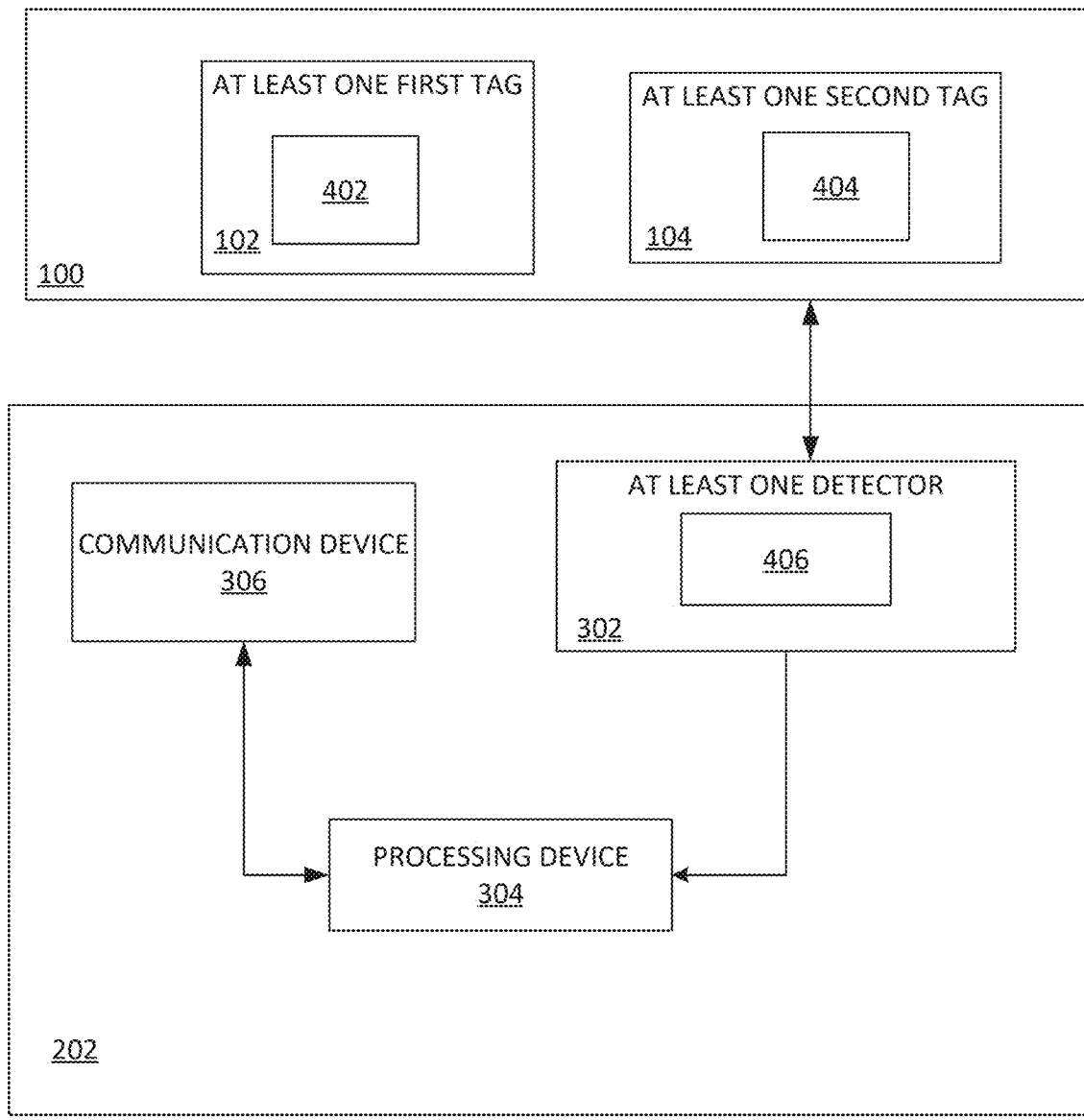
FIG. 4 is a block diagram of the apparatus 100 with the at least one compliance monitoring device 202, in accordance with some embodiments.

Further, in some embodiments, each of the plurality of tags 102-104 may include an electromagnetic (EM) wave-emitting device (402 and 404), as shown in FIG. 4. Further, the EM wave-emitting device (402 and 404) may include a transmitter, an antenna, etc. Further, the EM wave-emitting device (402 and 404) may be configured for generating electromagnetic waves. Further, the EM wave-emitting device (402 and 404) may be configured for emitting first electromagnetic waves with at least one first electro-magnetic wave characteristic. Further, the at least one first electromagnetic wave characteristic may include wavelength of the first electromagnetic waves, intensity of the first electromagnetic waves, frequency of the first electromagnetic waves, etc. Further, the at least one detector 302 may include at least one electromagnetic (EM) wave-receiving device 406, as shown in FIG. 4. Further, the at least one electromagnetic (EM) wave-receiving device 406 may include a receiver, an antenna, etc. Further, the at least one EM wave-receiving device 406 may be configured for receiving the first electromagnetic waves based on the emitting of the first electromagnetic waves. Further, the detecting of the plurality of tags 102-104 may be based on the receiving of the first electromagnetic waves.

Figure 5:
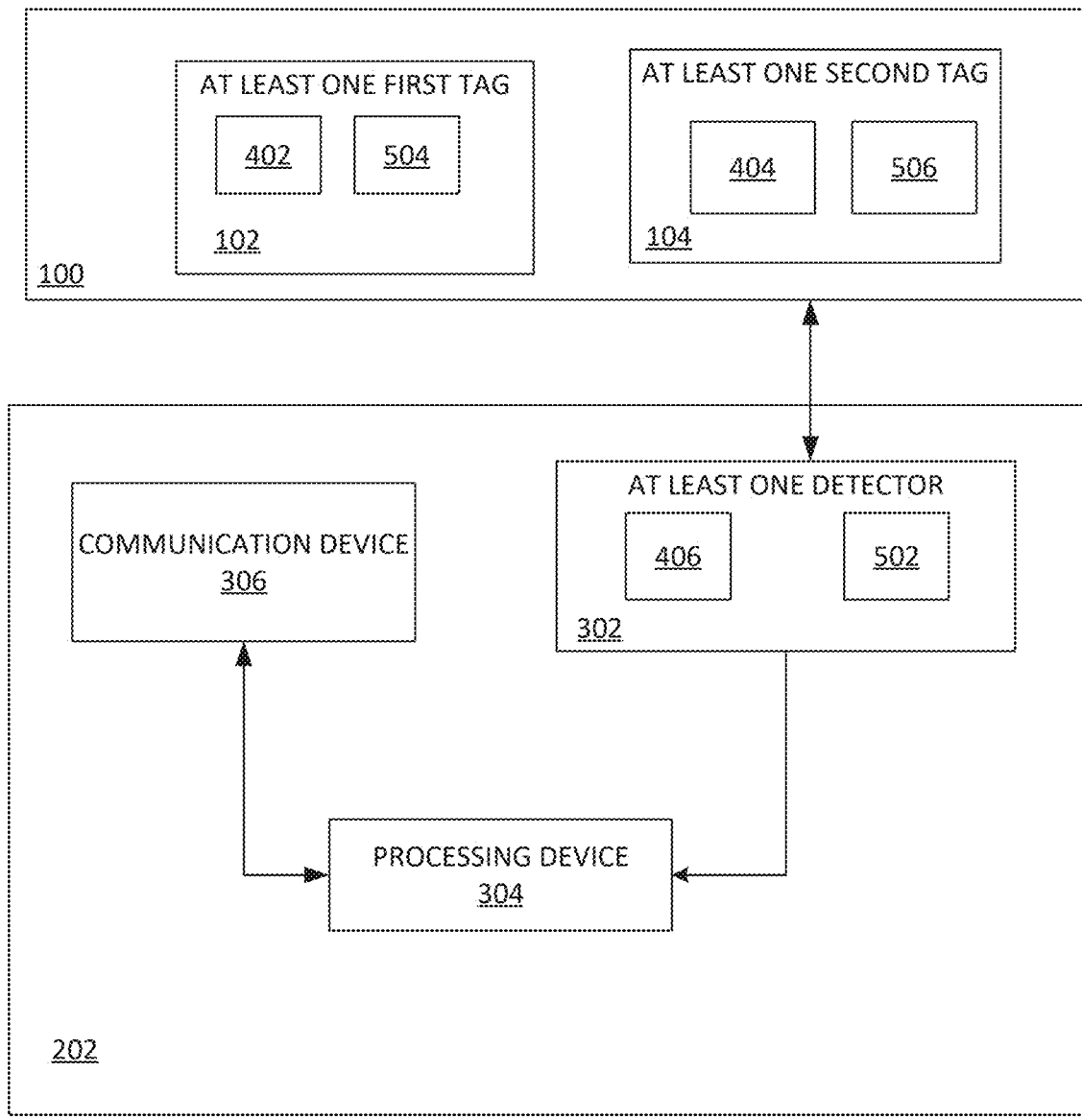
FIG. 5 is a block diagram of the apparatus 100 with the at least one compliance monitoring device 202, in accordance with some embodiments.

Further, in an embodiment, the at least one detector 302 may include at least one first electromagnetic (EM) wave-emitting device 502, as shown in FIG. 5. Further, the at least one first EM wave-emitting device 502 may be configured for emitting second electromagnetic waves with at least one second electromagnetic characteristic. Further, the at least one second electromagnetic characteristic may include wavelength of the second electromagnetic waves, intensity of the second electromagnetic waves, frequency of the second electromagnetic waves, etc. Further, at least one of the plurality of tags 102-104 may include at least one first electromagnetic (EM) wave-receiving device (504 and 506), as shown in FIG. 5. Further, the at least one first electromagnetic (EM) wave-receiving device (504 and 506) may include an antenna, a receiver, etc. Further, the at least one first EM wave-receiving device (504 and 506) may be configured for receiving the second electromagnetic waves based on the emitting of the second electromagnetic waves. Further, the emitting of the first electromagnetic waves by the EM wave-emitting device (402 and 404) of at least one of the plurality of tags 102-104 may be based on the receiving of the second electromagnetic waves.

Further, in an embodiment, the processing device 304 may be configured for translating the at least one first electromagnetic wave characteristic of the first electromagnetic waves by the EM wave-emitting device (402 and 404) of each of the plurality of tags 102-104. Further, the obtaining of the identifier associated with each of the plurality of tags 102-104 may be based on the translating.

Further, in an embodiment, the at least one first electromagnetic wave characteristic corresponds to at least one characteristic of each of the plurality of tags 102-104. Further, the at least one characteristic of each of the plurality of tags 102-104 may include a type of resistors, an arrangement of resistors, a type of semiconductor devices, etc. Further, the at least one characteristic may be unique to each of the plurality of tags 102-104.

Figure 6:
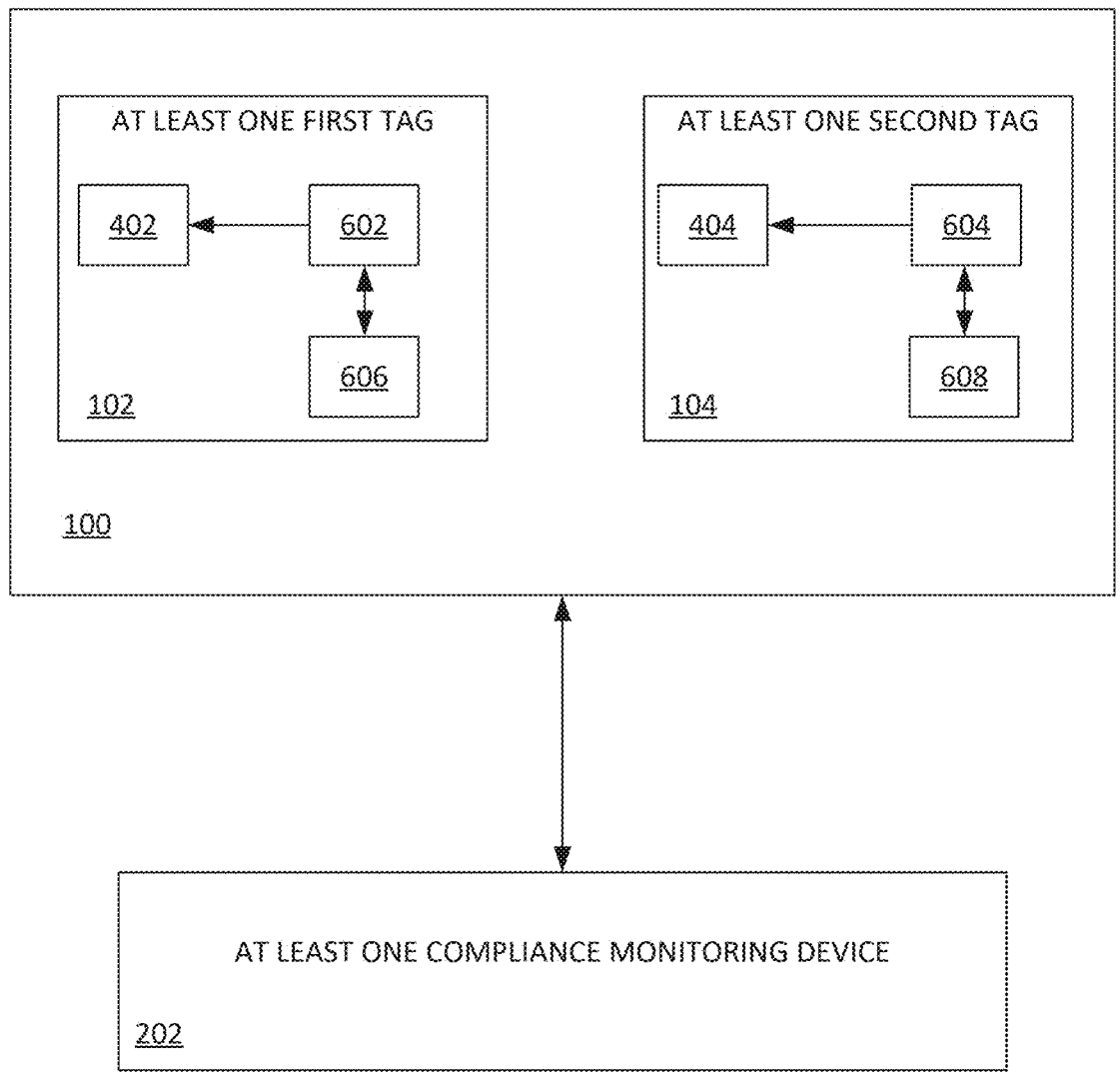
FIG. 6 is a block diagram of the apparatus 100 with the at least one compliance monitoring device 202, in accordance with some embodiments.

Further, in an embodiment, each of the plurality of tags 102-104 may include a memory device (606 and 608) and at least one tag circuitry (602 and 604), as shown in FIG. 6. Further, the memory device (606 and 608) may include a memory unit, at least one resistor, at least one transducer, etc. Further, the at least one tag circuitry (602 and 604) may include semiconductor devices, resistors, processing units, communication interface, etc. Further, the at least one tag circuitry (602 and 604) and the memory device (606 and 608) may be communicatively coupled with the memory device (606 and 608). Further, the memory device (606 and 608) stores the identifier. Further, the at least one tag circuitry (602 and 604) may be configured for accessing the identifier. Further, the at least one tag circuitry (602 and 604) may be configured for generating at least one signal with at least one signal characteristic based on the accessing. Further, the at least one signal may include an electrical signal, an electromagnetic signal, etc. Further, the at least one signal characteristic may include intensity of electric current and/or voltage, intensity of magnetic field, etc. Further, the at least one signal with the at least one signal characteristic encodes the identifier. Further, the EM wave-emitting device may be operatively coupled with the at least one tag circuitry (602 and 604). Further, the emitting of the first electromagnetic waves with the at least one first electromagnetic wave characteristic may be based on the at least one signal with the at least one signal characteristic. Further, the at least one first electromagnetic wave characteristic corresponds to the at least one signal characteristic.

Further, in some embodiments, the processing device 304 may be further configured for identifying the user based on the analyzing of the identifier of each of the plurality of tags 102-104 and the at least one data. Further, the generating of the at least one notification may be further based on the identifying of the user. Further, the at least one notification may include at least one user identifier of the user. Further, the at least one user identifier may include a name of the user, an identity card of the user, etc.

Figure 7:
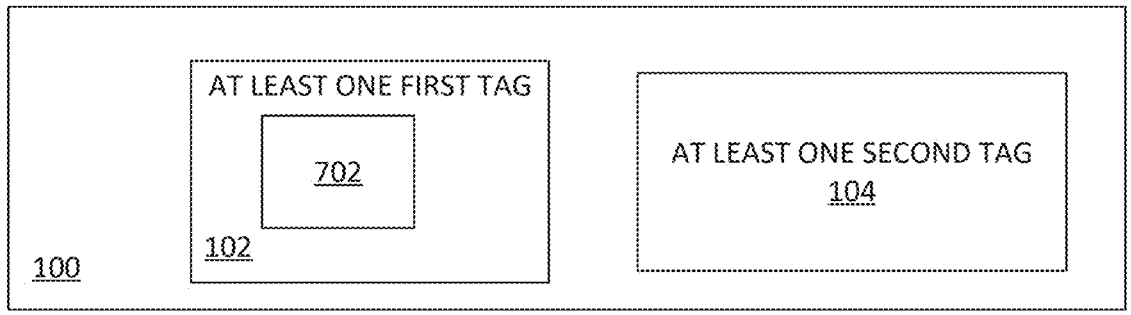
FIG. 7 is a block diagram of the apparatus 100, in accordance with some embodiments.

Further, in some embodiments, the plurality of tags 102-104 may include at least one first tag 102. Further, the at least one first tag 102 may include a power source 702, as shown in FIG. 7. Further, the power source 702 may include a battery, a capacitor, etc. Further, the at least one first tag 102 may be comprised in a first item 902, as shown in FIG. 9, of the plurality of items 902-904. Further, the power source 702 may be configured for powering the at least one first tag 102. Further, the detecting of the plurality of tags 102-104 may include detecting the at least one first tag 102. Further, the detecting of the at least one first tag 102 may be based on the powering. Further, the at least one first tag 102 may be an active RFID tag. Further, the at least one first tag 102 may be associated with ultra-high frequency (UHF).

Figure 8:
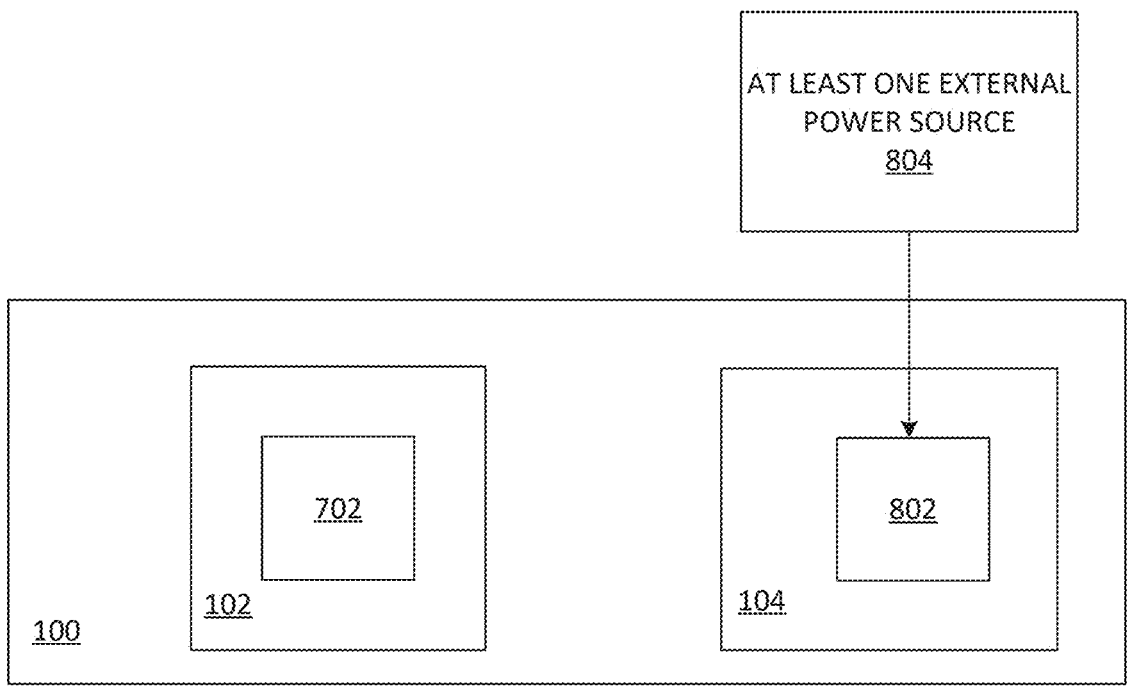
FIG. 8 is a block diagram of the apparatus 100 with at least one external power source 804, in accordance with some embodiments.

Further, in an embodiment, the plurality of tags 102-104 may include at least one second tag 104. Further, the at least one second tag 104 may be comprised in at least one second item 904 of the plurality of items 902-904. Further, the at least one second tag 104 may include at least one energy harvesting device 802, as shown in FIG. 8. Further, the at least one energy harvesting device 802 may include transducers, rectifiers, etc. Further, the at least one energy harvesting device 802 may be configured for harvesting energy from at least one external power source 804, as shown in FIG. 8, for powering the at least one second tag 104. Further, the at least one external power source 804 may include a battery, a capacitor, an electromagnetic wave emitting device, etc. Further, the detecting of the plurality of tags 102-104 may include detecting the at least one second tag 104. Further, the detecting of the at least one second tag 104 may be based on the powering of the at least one second tag 104. Further, the at least one second tag 104 may include a passive RFID tag, a semi passive RFID tag, etc. Further, the at least one second tag 104 may be associated with ultra-high frequency.

In further embodiments, the apparatus 100 may include at least one holder 906, as shown in FIG. 9. Further, the at least one holder 906 may include a case with a cavity to hold at least one of the plurality of items 902-904. Further, the at least one holder 906 may be configured for securing at least one of the plurality of tags 102-104 comprised in at least one of the plurality of items 902-904.

Figure 10:
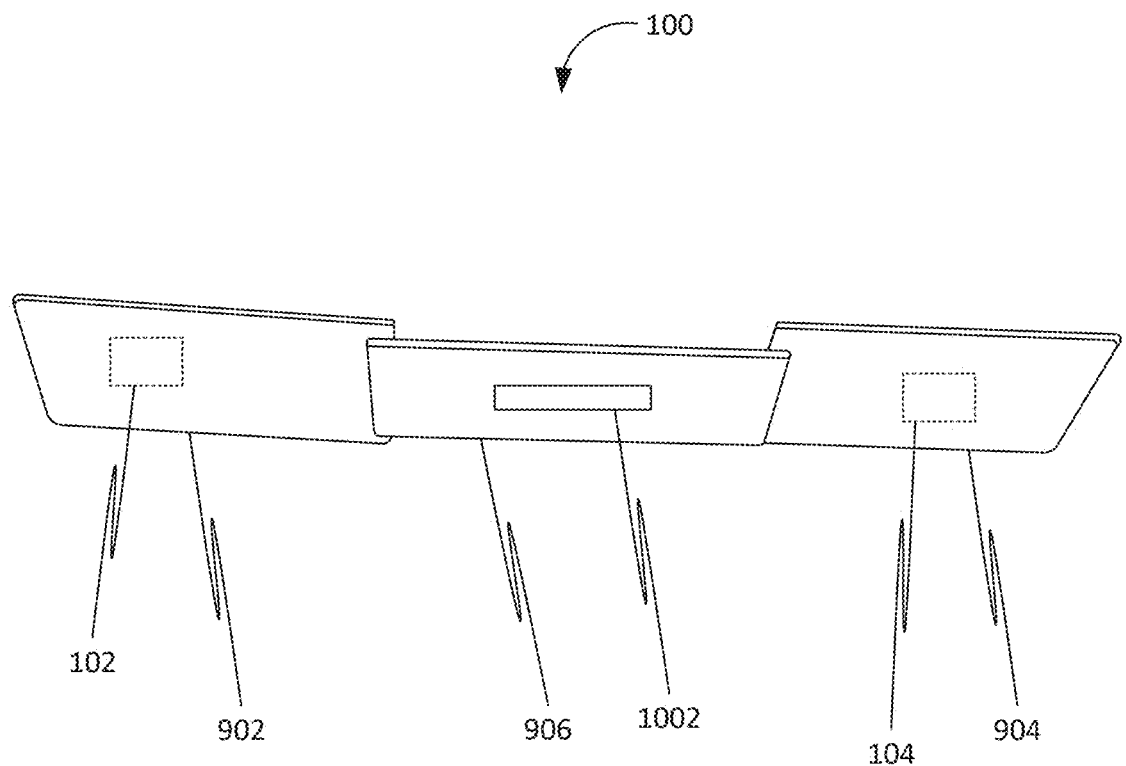
FIG. 10 is a bottom perspective view of the apparatus 100 with at least one attaching element 1002, in accordance with some embodiments.

Further, in an embodiment, the at least one holder 906 may be configured to be attached to at least one surface of at least one object using at least one attaching element 1002, as shown in FIG. 10. Further, the at least one attaching element 1002 may include a suction cap, a removable adhesive element, etc. Further, the at least one object may include a windshield of a car, a helmet, etc.

Further, in some embodiments, the at least one data may include a list of registered identifiers, a list of item identifiers of a list of items corresponding to the list of identifiers, and a list of user identifiers of a list of users corresponding to the list of items. Further, the list of registered identifiers may include a collection of a series of numbers, a series of alphabets, a series of alphanumeric code, etc. registered in the database. Further, the list of item identifiers may include a collection of identifiers associated with the list of items. Further, the list of items may include a collection of identities associated with a plurality of items. Further, the plurality of items may include a driving license, a vehicle registration book, a license plate, etc. Further, the item identifiers may include the license number associated with the driving license, the registration number associated with the vehicle registration book, vehicle number associated with the license plate. Further, the analyzing may include matching the identifier of each of the plurality of tags 102-104 associated with the plurality of items 902-904. Further, the determining of the anomaly may be further based on the matching.

Further, in some embodiments, each of the plurality of items 902-904 may be a physical form of each of a plurality of documents associated with the user. Further, the physical form of each of the plurality of documents may include a card, a license plate, etc. Further, the plurality of documents may include a driver license, a title ownership, a vehicle registration certificate, vehicle ownership proof, etc. Further, the establishing of the compliance may be based on the plurality of documents. Further, each of the plurality of items 902-904 may include each of the plurality of tags 102-104.

Figure 2:
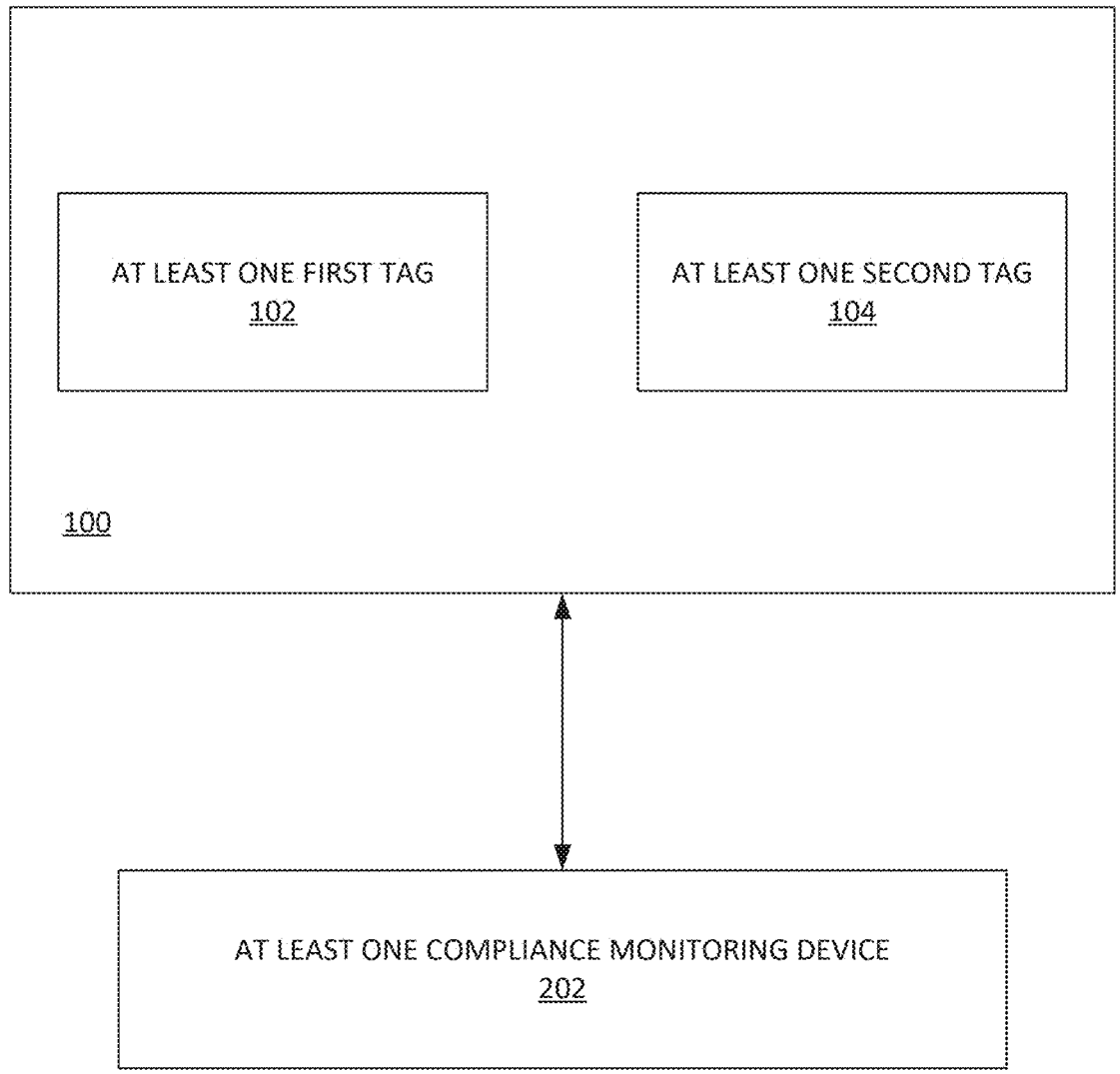
FIG. 2 is a block diagram of the apparatus 100 with at least one compliance monitoring device 202, in accordance with some embodiments.
Figure 3:
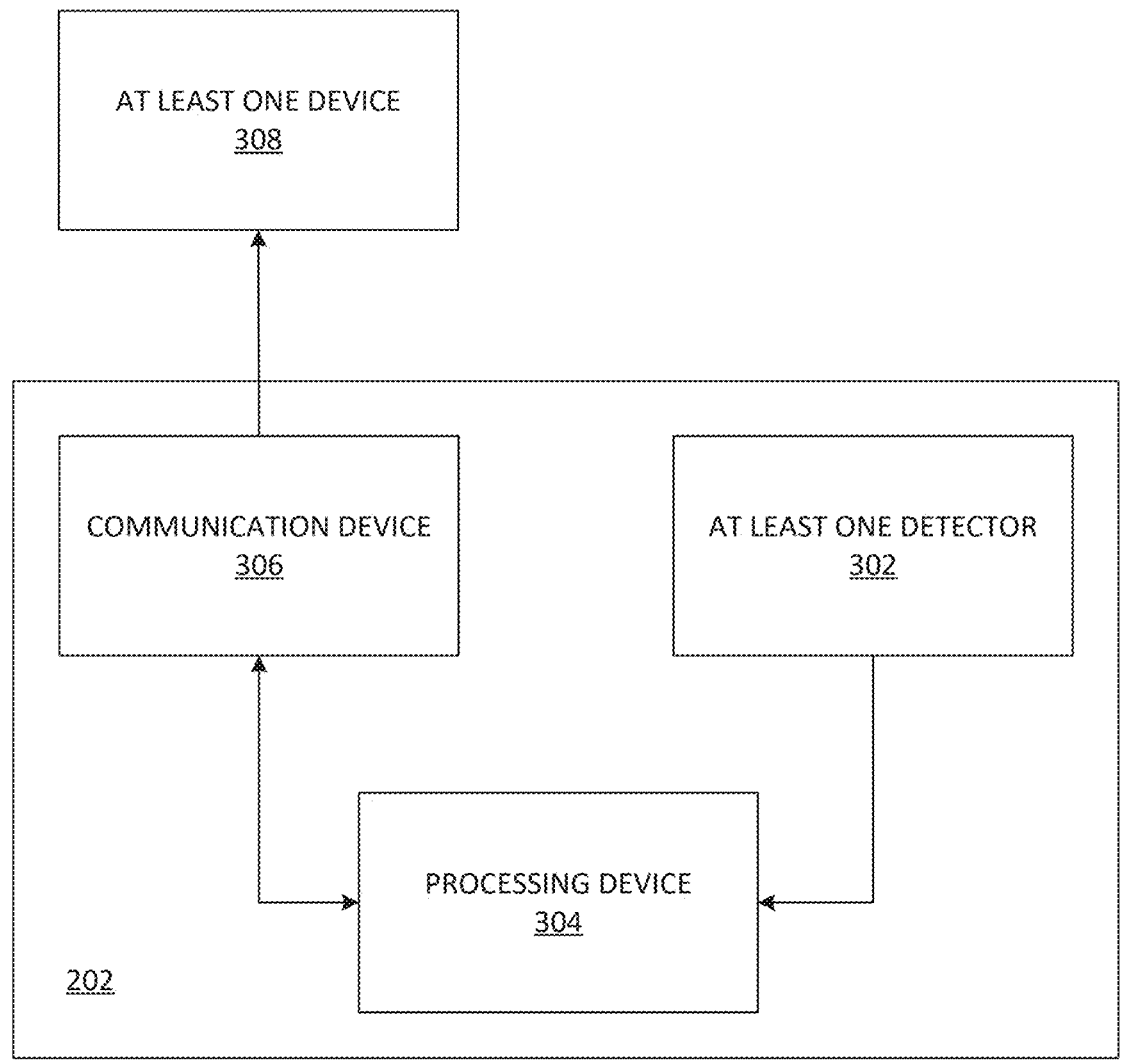
FIG. 3 is a block diagram of the at least one compliance monitoring device 202 with at least one device 308, in accordance with some embodiments.

FIG. 2 is a block diagram of the apparatus 100 with the at least one compliance monitoring device 202, in accordance with some embodiments.

FIG. 3 is a block diagram of the at least one compliance monitoring device 202 with the at least one device 308, in accordance with some embodiments.

FIG. 4 is a block diagram of the apparatus 100 with the at least one compliance monitoring device 202, in accordance with some embodiments.

FIG. 5 is a block diagram of the apparatus 100 with the at least one compliance monitoring device 202, in accordance with some embodiments.

FIG. 6 is a block diagram of the apparatus 100 with the at least one compliance monitoring device 202, in accordance with some embodiments.

FIG. 7 is a block diagram of the apparatus 100, in accordance with some embodiments.

FIG. 8 is a block diagram of the apparatus 100 with at least one external power source 804, in accordance with some embodiments.

FIG. 9 is a bottom perspective view of the apparatus 100 with the at least one holder 906, in accordance with some embodiments.

FIG. 10 is a bottom perspective view of the apparatus 100 with the at least one attaching element 1002, in accordance with some embodiments.

Figure 11:
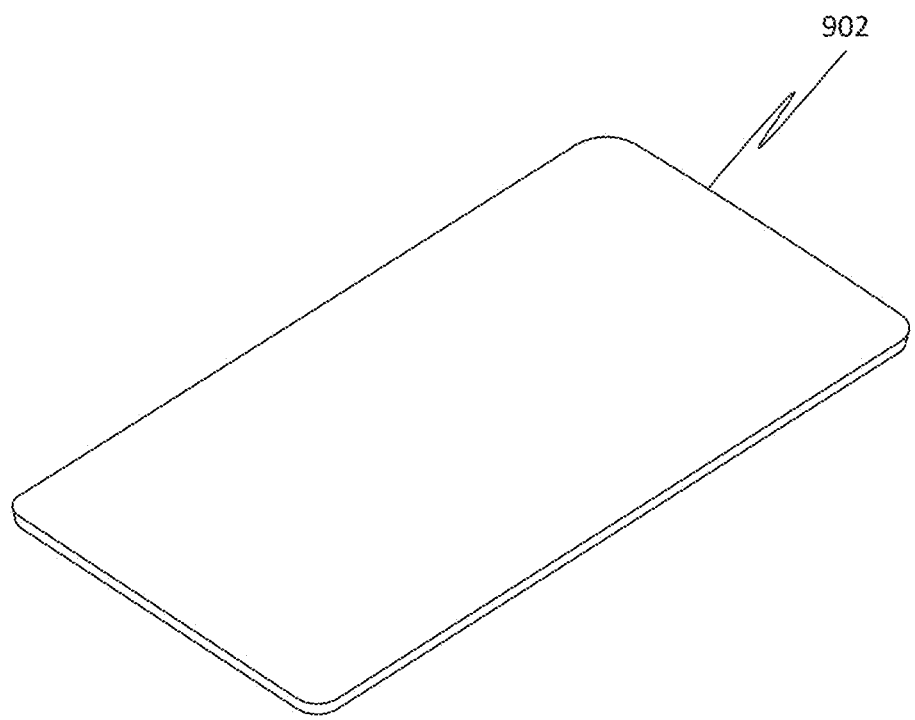
FIG. 11 is a top perspective view of a first item 902 of the plurality of items 902-904, in accordance with some embodiments.

FIG. 11 is a top perspective view of the first item 902 of the plurality of items 902-904, in accordance with some embodiments.

Figure 12:
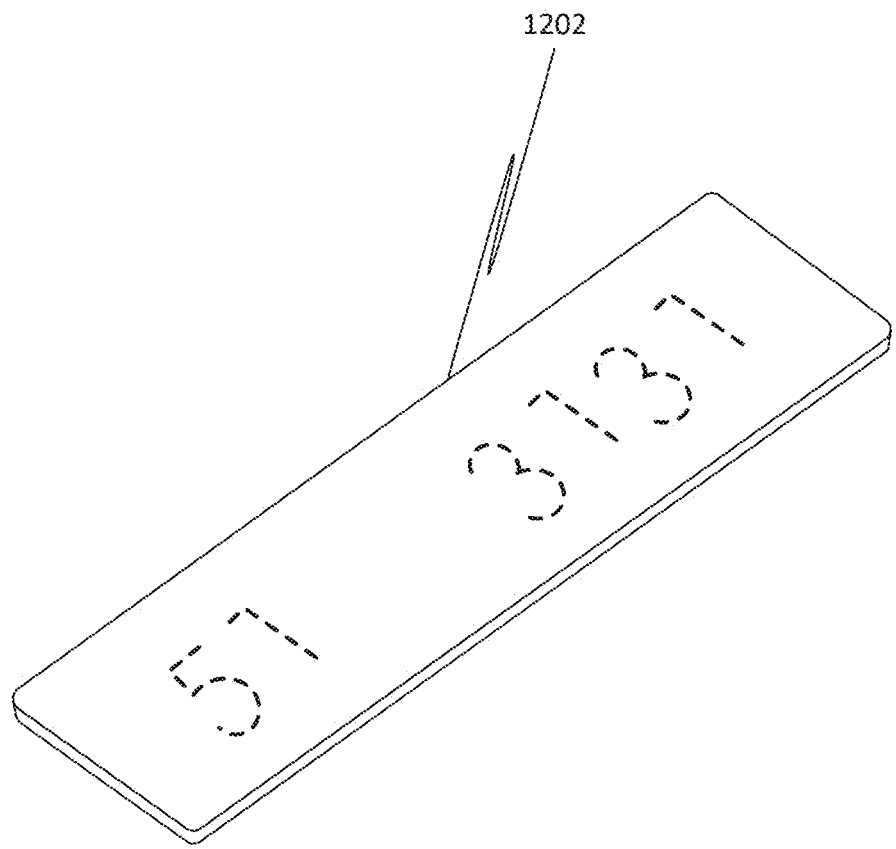
FIG. 12 is a top perspective view of an item 1202 associated with the apparatus 100, in accordance with some embodiments.

FIG. 12 is a top perspective view of an item 1202 associated with the apparatus 100, in accordance with some embodiments. Further, the item 1202 may include a license plate of a vehicle. Further, the item 1202 may include the at least one first tag 902. Further, the at least one first tag 902 may be an active RFID tag.

Figure 13:
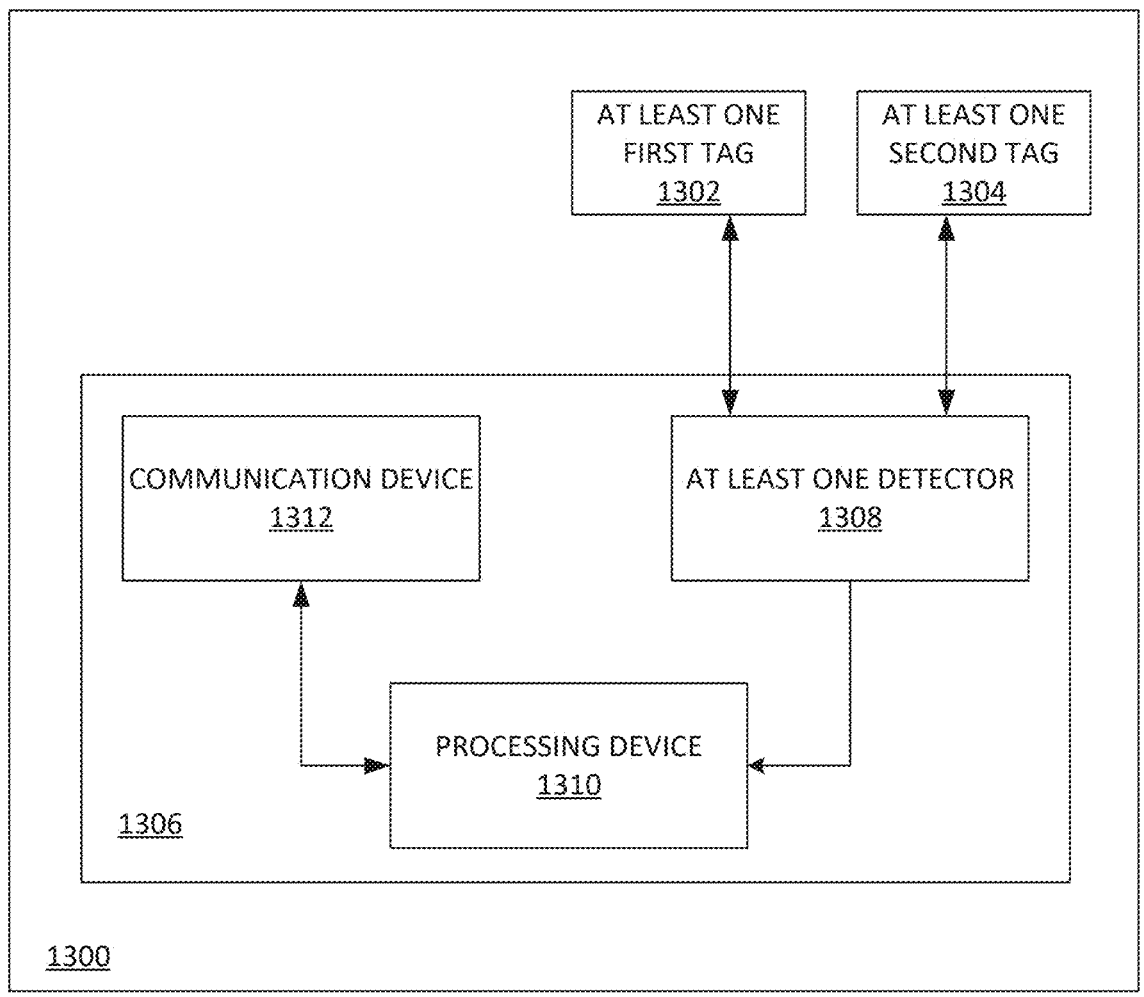
FIG. 13 is a block diagram of an apparatus 1300 for facilitating a compliance with requirements for users, in accordance with some embodiments.

FIG. 13 is a block diagram of an apparatus 1300 for facilitating a compliance with requirements for users, in accordance with some embodiments. Accordingly, the apparatus 1300 may include a plurality of tags 1302-1304 and at least one compliance monitoring device 1306.

Further, the plurality of tags 1302-1304 may be configured to be comprised in a plurality of items associated with a user. Further, the plurality of tags 1302-1304 may include radio frequency identification tags (RFID tags), near field communication tags (NFC tags), etc. Further, the plurality of items may include a driving license, vehicle registration book, license plate, documents, etc. Further, the plurality of tags 1302-1304 may be associated with a plurality of identifiers. Further, the plurality of identifiers may include a series of numbers, a series of alphabets, an alphanumeric code, etc. Further, the plurality of tags 1302-1304 may be configured for establishing the compliance with at least one requirement for the user. Further, the at least one requirement may include availability of the plurality of items, authenticity of the plurality of items, etc.

Further, the at least one compliance monitoring device 1306 may include a computing device, a pc, a desktop, a smartphone, a computer, etc. Further, the at least one compliance monitoring device 1306 may include at least one detector 1308 configured for detecting the plurality of tags 1302-1304. Further, the at least one detector 1308 may include an RFID reader, an NFC reader, etc. Further, the at least one compliance monitoring device 1306 may include a processing device 1310. Further, the processing device 1310 may be communicatively coupled with the at least one detector 1308. Further, the processing device 1310 may include a computer, a smartphone, a server, etc. Further, the processing device 1310 may be configured for obtaining an identifier associated with each of the plurality of tags 1302-1304 based on the detecting. Further, the identifier may include a series of numbers, a series of alphabets, an alphanumeric code, etc. Further, the identifier may be unique to each of the plurality of tags 1302-1304. Further, the processing device 1310 may be configured for obtaining at least one data. Further, the at least one data may include a name of owner of a vehicle, a registration number, a driving license number, etc. Further, the processing device 1310 may be configured for analyzing the at least one data and the identifier of each of the plurality of tags 1302-1304 based on the at least one requirement. Further, the processing device 1310 may be configured for determining an anomaly in the establishing of the compliance with the at least one requirement based on the analyzing of the at least one data and the identifier. Further, the anomaly may include an absence of at least one tag, a mismatch in the at least one data and the identifier. Further, the processing device 1310 may be configured for generating at least one notification based on the determining of the anomaly. Further, the at least one notification may include an alert for counterfeit documents, an alert for unavailability of documents, an indication of legit documents.

Further, the at least one compliance monitoring device 1306 may include a communication device 1312 communicatively coupled with the processing device 1310. Further, the communication device 1312 may include a transceiver, a communication interface, a network interface, etc. Further, the communication device 1312 may be configured for transmitting the at least one notification to at least one device.

Further, in some embodiments, each of the plurality of tags 1302-1304 may include an electromagnetic (EM) wave-emitting device. Further, the EM wave-emitting device may include a transmitter, an antenna, etc. Further, the EM wave-emitting device may be configured for generating electromagnetic waves. Further, the EM wave-emitting device may be configured for emitting first electromagnetic waves with at least one first electromagnetic wave characteristic. Further, the at least one first electromagnetic wave characteristic may include wavelength of the first electromagnetic wave, intensity of the first electromagnetic wave, frequency of the first electromagnetic wave, etc. Further, the at least one detector 1308 may include at least one electromagnetic (EM) wave-receiving device. Further, the at least one electromagnetic (EM) wave-receiving device 406 may include a receiver, an antenna, etc. Further, the at least one EM wave-receiving device may be configured for receiving the first electromagnetic waves based on the emitting of the first electromagnetic waves. Further, the detecting of the plurality of tags 1302-1304 may be based on the receiving of the first electromagnetic waves.

Further, in an embodiment, the at least one detector 1308 may include at least one first electromagnetic (EM) wave-emitting device. Further, the at least one first EM wave-emitting device may be configured for emitting second electromagnetic waves with at least one second electromagnetic characteristic. Further, the at least one second electromagnetic characteristic may include wavelength of second electromagnetic wave, intensity of second electromagnetic wave, frequency of second electromagnetic wave, etc. Further, at least one of the plurality of tags 1302-1304 may include at least one first electromagnetic (EM) wave-receiving device. Further, the at least one first electromagnetic (EM) wave-receiving device 504 and 506 may include an antenna, a receiver, etc. Further, the at least one first EM wave-receiving device may be configured for receiving the second electromagnetic waves based on the emitting of the second electromagnetic waves. Further, the emitting of the first electromagnetic waves by the EM wave-emitting device of at least one of the plurality of tags 1302-1304 may be further based on the receiving of the second electromagnetic waves.

Further, in an embodiment, the processing device 1310 may be further configured for translating the at least one first electromagnetic wave characteristic of the first electromagnetic waves by the EM wave-emitting device of each of the plurality of tags 1302-1304. Further, the obtaining of the identifier associated with each of the plurality of tags 1302-1304 may be further based on the translating.

Further, in an embodiment, the at least one data may include a list of registered identifiers, a list of item identifiers of a list of items corresponding to the list of identifiers, and a list of user identifiers of a list of users corresponding to the list of items. Further, the list of registered identifiers may include a collection of a series of numbers, a series of alphabets, a series of alphanumeric code, etc. registered in the database. Further, the list of item identifiers may include a collection of identifiers associated with the list of items. Further, the list of items may include a collection of identities associated with a plurality of items. Further, the plurality of items may include a driving license, a vehicle registration book, a license plate, etc. Further, the item identifiers may include license number associated with the driving license, registration number associated with the vehicle registration book, vehicle number associated with the license plate. Further, the analyzing may include matching the identifier of each of the plurality of tags 1302-1304 associated with the plurality of items. Further, the determining of the anomaly may be further based on the matching.

Further, in an embodiment, each of the plurality of items may be a physical form of each of a plurality of documents associated with the user. Further, the physical form of each of the plurality of documents may include a card, a paper, a file, etc. Further, the establishing of the compliance may be based on the plurality of documents. Further, each of the plurality of items may include each of the plurality of tags 1302-1304.

Figure 14:
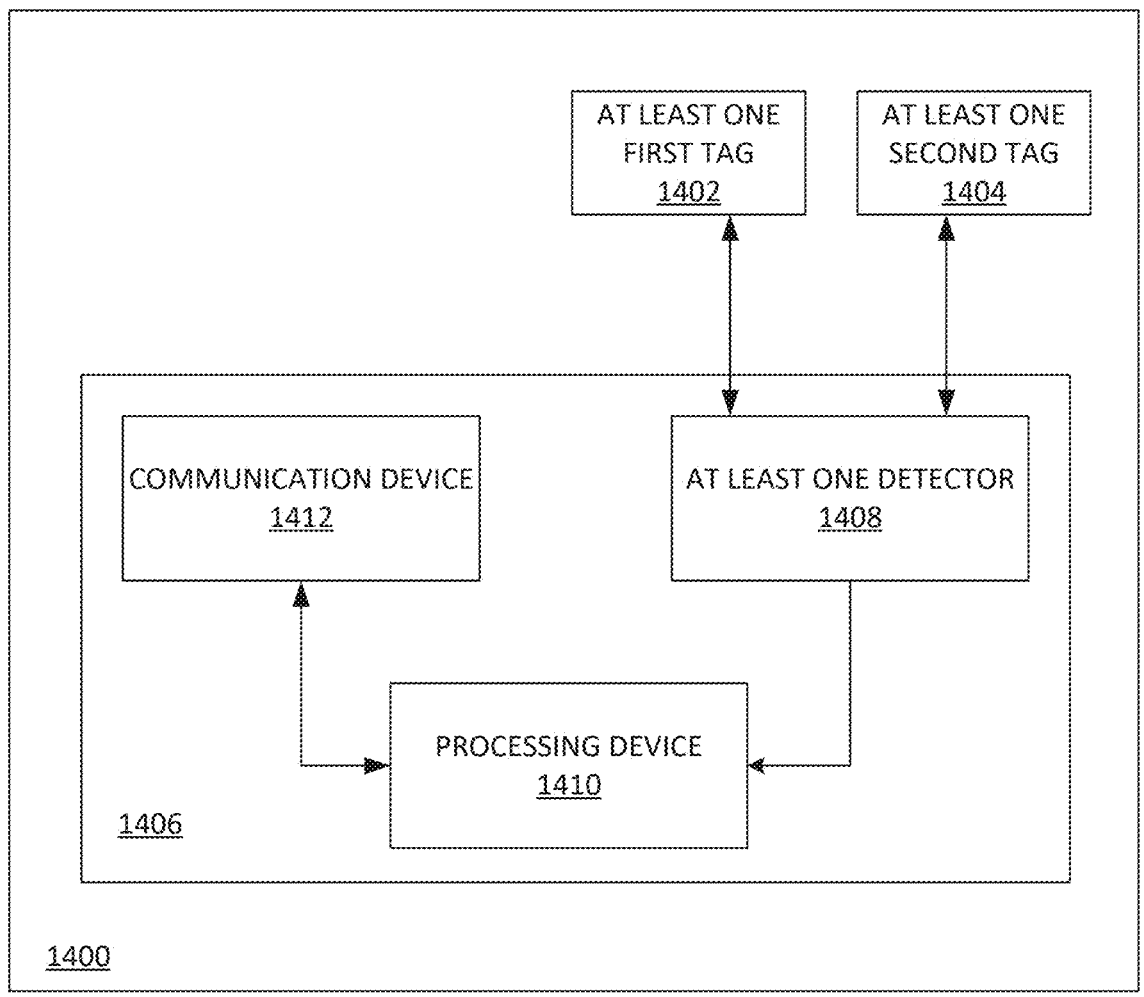
FIG. 14 is a block diagram of an apparatus 1400 for facilitating a compliance with requirements for users, in accordance with some embodiments.

FIG. 14 is a block diagram of an apparatus 1400 for facilitating a compliance with requirements for users, in accordance with some embodiments. Accordingly, the apparatus 1400 may include a plurality of tags 1402-1404 and at least one compliance monitoring device 1406.

Further, the plurality of tags 1402-1404 may be configured to be comprised in a plurality of items associated with a user. Further, the plurality of tags 1402-1404 may include radio frequency identification (RFID) tags, near field communication tags (NFC tags), etc. Further, the plurality of items may include a driving license, vehicle registration book, license plate, documents, etc. Further, the plurality of tags 1402-1404 may be associated with a plurality of identifiers. Further, the plurality of identifiers may include a series of numbers, a series of alphabets, an alphanumeric code, etc. Further, the plurality of tags 1402-1404 may be configured for establishing the compliance with at least one requirement for the user. Further, the at least one requirement may include availability of the plurality of items, authenticity of the plurality of items, etc. Further, each of the plurality of items may be a physical form of each of a plurality of documents associated with the user. Further, the physical form of each of the plurality of documents may include a card, a paper, a file, etc. Further, the establishing of the compliance may be based on the plurality of documents. Further, each of the plurality of items may include each of the plurality of tags 1402-1404.

Further, the at least one compliance monitoring device 1406 may include a computing device, a pc, a desktop, a smartphone, a computer, etc. Further, the at least one compliance monitoring device 1406 may include at least one detector 1408 configured for detecting the plurality of tags 1402-1404. Further, the at least one detector 1408 may include an RFID reader, an NFC reader, etc. Further, the at least one compliance monitoring device 1406 may include a processing device 1410 communicatively coupled with the at least one detector 1408. Further, the processing device 1410 may include a computer, a smartphone, a server, etc. Further, the processing device 1410 may be configured for obtaining an identifier associated with each of the plurality of tags 1402-1404 based on the detecting. Further, the identifier may be unique to each of the plurality of tags 1402-1404. Further, the identifier may include a series of numbers, a series of alphabets, an alphanumeric code, etc. Further, the processing device 1410 may be configured for obtaining at least one data. Further, the at least one data may include a name of owner of a vehicle, a registration number, a driving license number, etc. Further, the processing device 1410 may be configured for analyzing the at least one data and the identifier of each of the plurality of tags 1402-1404 based on the at least one requirement. Further, the processing device 1410 may be configured for determining an anomaly in the establishing of the compliance with the at least one requirement based on the analyzing of the at least one data and the identifier. Further, the anomaly may include an absence of at least one tag, a mismatch in the at least one data and the identifier. Further, the processing device 1410 may be configured for generating at least one notification based on the determining of the anomaly.

Further, the at least one compliance monitoring device 1406 may include a communication device 1412 communicatively coupled with the processing device 1410. Further, the communication device 1412 may include a transceiver, a communication interface, a network interface, etc. Further, the communication device 1412 may be configured for transmitting the at least one notification to at least one device.

Figure 15:
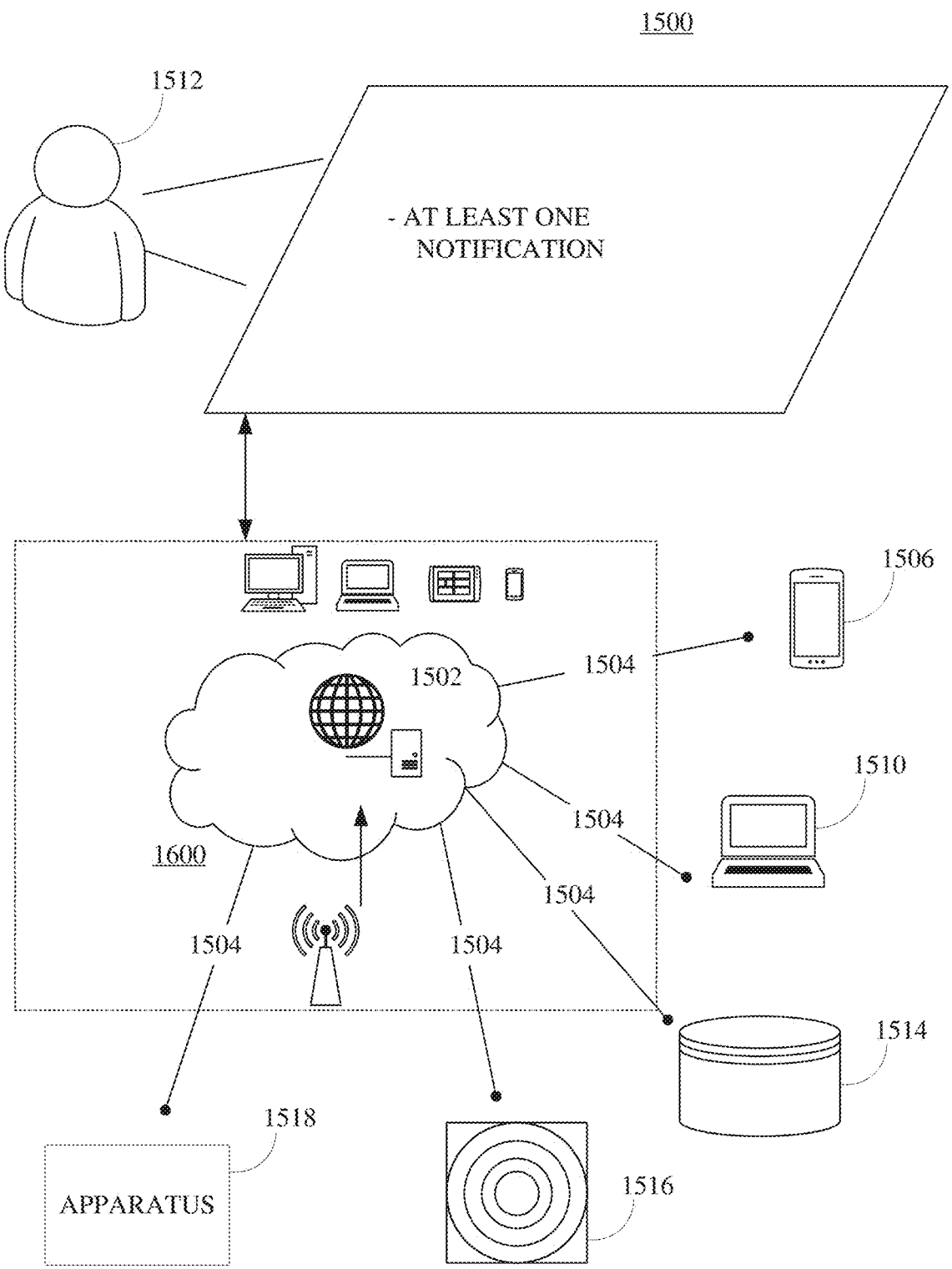
FIG. 15 is an illustration of an online platform consistent with various embodiments of the present disclosure.

FIG. 15 is an illustration of an online platform 1500 consistent with various embodiments of the present disclosure. By way of non-limiting example, the online platform 1500 to facilitate a compliance with requirements for users may be hosted on a centralized server 1502, such as, for example, a cloud computing service. The centralized server 1502 may communicate with other network entities, such as, for example, a mobile device 1506 (such as a smartphone, a laptop, a tablet computer, etc.), other electronic devices 1510 (such as desktop computers, server computers, etc.), databases 1514 and sensors 1516, an apparatus 1518 (such as the apparatus 100, the apparatus 1300, the apparatus 1400, etc.) over a communication network 1504, such as, but not limited to, the Internet. Further, users of the online platform 1500 may include relevant parties such as, but not limited to, users, administrators, service providers, service consumers, police officers, and so on. Accordingly, in some instances, electronic devices operated by the one or more relevant parties may be in communication with the platform.

A user 1512, such as the one or more relevant parties, may access online platform 1500 through a web-based software application or browser. The web-based software application may be embodied as, for example, but not be limited to, a website, a web application, a desktop application, and a mobile application compatible with a computing device 1600.

Figure 16:
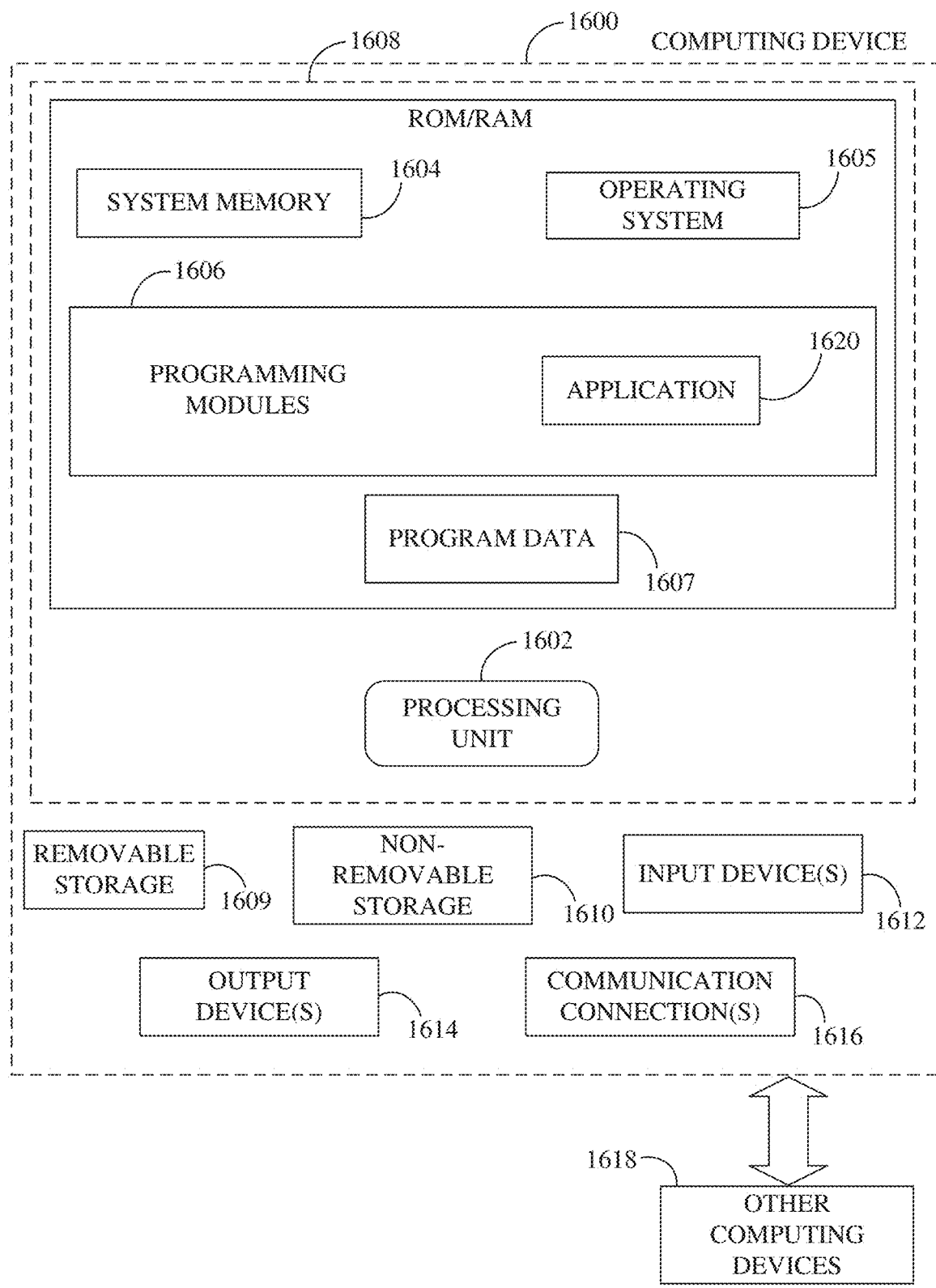
FIG. 16 is a block diagram of a computing device for implementing the methods disclosed herein, in accordance with some embodiments.

With reference to FIG. 16, a system consistent with an embodiment of the disclosure may include a computing device or cloud service, such as computing device 1600. In a basic configuration, computing device 1600 may include at least one processing unit 1602 and a system memory 1604. Depending on the configuration and type of computing device, system memory 1604 may comprise, but is not limited to, volatile (e.g., random-access memory (RAM)), non-volatile (e.g., read-only memory (ROM)), flash memory, or any combination. System memory 1604 may include operating system 1605, one or more programming modules 1606, and may include a program data 1607. Operating system 1605, for example, may be suitable for controlling computing device 1600's operation. In one embodiment, programming modules 1606 may include image-processing module. Furthermore, embodiments of the disclosure may be practiced in conjunction with a graphics library, other operating systems, or any other application program and is not limited to any particular application or system. This basic configuration is illustrated in FIG. 16 by those components within a dashed line 1608.

Computing device 1600 may have additional features or functionality. For example, computing device 1600 may also include additional data storage devices (removable and/or non-removable) such as, for example, magnetic disks, optical disks, or tape. Such additional storage is illustrated in FIG. 16 by a removable storage 1609 and a non-removable storage 1610. Computer storage media may include volatile and non-volatile, removable and non-removable media implemented in any method or technology for storage of information, such as computer-readable instructions, data structures, program modules, or other data. System memory 1604, removable storage 1609, and non-removable storage 1610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1600. Any such computer storage media may be part of device 1600. Computing device 1600 may also have input device(s) 1612 such as a keyboard, a mouse, a pen, a sound input device, a touch input device, a location sensor, a camera, a biometric sensor, etc. Output device(s) 1614 such as a display, speakers, a printer, etc. may also be included. The aforementioned devices are examples and others may be used.

Computing device 1600 may also contain a communication connection 1616 that may allow device 1600 to communicate with other computing devices 1618, such as over a network in a distributed computing environment, for example, an intranet or the Internet. Communication connection 1616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1604, including operating system 1605. While executing on processing unit 1602, programming modules 1606 (e.g., application 1620 such as a media player) may perform processes including, for example, one or more stages of methods, algorithms, systems, applications, servers, databases as described above. The aforementioned process is an example, and processing unit 1602 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Referring to FIGS. 1-16, apparatuses and an online platform for facilitating compliance with requirements for users are disclosed. Accordingly, the apparatuses may include a plurality of tags and at least one compliance monitoring device. Further, the plurality of tags may be configured to be comprised in a plurality of items. Further, the plurality of tags may include a plurality of radio frequency identification (RFID) tags. Further, the plurality of RFID tags may be configured to be detected by the at least one compliance monitoring device. Further, the plurality of tags may include at least one active RFID tag and at least one passive RFID tag. Further, the at least one active RFID tag may be configured to be detected from a long range by the at least one compliance monitoring device. Further, the at least one passive RFID tag may be configured to be detected from a short range by the at least one compliance monitoring device. Further, the at least one compliance monitoring device may include a communication device, a processing device, and at least one detector. Further, the at least one detector may be configured for detecting the plurality of tags. Further, the at least one detector may include at least one electromagnetic (EM) wave-receiving device and at least one first electromagnetic (EM) wave-transmitting device. Further, the at least one electromagnetic (EM) wave-receiving device may be configured for receiving first electromagnetic waves from the plurality of tags and the at least one first electromagnetic (EM) wave-transmitting device may be configured for transmitting second electromagnetic waves. Further, the processing device may be configured for obtaining an identifier associated with the plurality of tags. Further, the processing device may be configured for generating at least one notification based on the analyzing. Further, the communication device may be configured for transmitting the at least one notification to at least one device. Further, the online platform may be configured for providing a user interface and server to the users for facilitating a compliance with requirements for users. Further, the online platform may include a computing device. Further, the computing device communicates with the apparatuses, other electronic devices, sensors, databases, mobile devices, etc.

Although the present disclosure has been explained in relation to its preferred embodiment, it is to be understood that many other possible modifications and variations can be made without departing from the spirit and scope of the disclosure.

What is claimed is:

1. An apparatus for facilitating a compliance with requirements for users, the apparatus comprising:
    a plurality of tags configured to be comprised in a plurality of items associated with a user, wherein the plurality of tags is associated with a plurality of identifiers, wherein the plurality of tags is configured for establishing the compliance with at least one requirement for the user through at least one compliance monitoring device, wherein the at least one compliance monitoring device comprises:
        at least one detector configured for detecting the plurality of tags;
        a processing device communicatively coupled with the at least one detector, wherein the processing device is configured for:
            obtaining an identifier associated with each of the plurality of tags based on the detecting, wherein the identifier is unique to each of the plurality of tags;
            obtaining at least one data;
            analyzing the at least one data and the identifier of each of the plurality of tags based on the at least one requirement;
            determining an anomaly in the establishing of the compliance with the at least one requirement based on the analyzing of the at least one data and the identifier; and
            generating at least one notification based on the determining of the anomaly; and
        a communication device communicatively coupled with the processing device, wherein the communication device is configured for transmitting the at least one notification to at least one device.

2. The apparatus of claim 1, wherein each of the plurality of tags comprises an electromagnetic (EM) wave-emitting device, wherein the EM wave-emitting device is configured for emitting first electromagnetic waves with at least one first electromagnetic wave characteristic, wherein the at least one detector comprises at least one electromagnetic (EM) wave-receiving device, wherein the at least one EM wave-receiving device is configured for receiving the first electromagnetic waves based on the emitting of the first electromagnetic waves, wherein the detecting of the plurality of tags is based on the receiving of the first electromagnetic waves.

3. The apparatus of claim 2, wherein the at least one detector further comprises at least one first electromagnetic (EM) wave-emitting device, wherein the at least one first EM wave-emitting device is configured for emitting second electromagnetic waves with at least one second electromagnetic characteristic, wherein at least one of the plurality of tags comprises at least one first electromagnetic (EM) wave-receiving device, wherein the at least one first EM wave-receiving device is configured for receiving the second electromagnetic waves based on the emitting of the second electromagnetic waves, wherein the emitting of the first electromagnetic waves by the EM wave-emitting device of at least one of the plurality of tags is further based on the receiving of the second electromagnetic waves.

4. The apparatus of claim 2, wherein the processing device is further configured for translating the at least one first electromagnetic wave characteristic of the first electromagnetic waves by the EM wave-emitting device of each of the plurality of tags, wherein the obtaining of the identifier associated with each of the plurality of tags is further based on the translating.

5. The apparatus of claim 4, wherein the at least one first electromagnetic wave characteristic corresponds to at least one characteristic of each of the plurality of tags, wherein the at least one characteristic is unique to each of the plurality of tags.

6. The apparatus of claim 4, wherein each of the plurality of tags comprises a memory device and at least one tag circuitry communicatively coupled with the memory device, wherein the memory device stores the identifier, wherein the at least one tag circuitry is configured for accessing the identifier, wherein the at least one tag circuitry is configured for generating at least one signal with at least one signal characteristic based on the accessing, wherein the at least one signal with the at least one signal characteristic encodes the identifier, wherein the EM wave-emitting device is operatively coupled with the at least one tag circuitry, wherein the emitting of the first electromagnetic waves with the at least one first electromagnetic wave characteristic is based on the at least one signal with the at least one signal characteristic, wherein the at least one first electromagnetic wave characteristic corresponds to the at least one signal characteristic.

7. The apparatus of claim 1, wherein the processing device is further configured for identifying the user based on the analyzing of the identifier of each of the plurality of tags and the at least one data, wherein the generating of the at least one notification is further based on the identifying of the user, wherein the at least one notification comprises at least one user identifier of the user.

8. The apparatus of claim 1, wherein the plurality of tags comprises at least one first tag, wherein the at least one first tag comprises a power source, wherein the at least one first tag is comprised in a first item of the plurality of items, wherein the power source is configured for powering the at least one first tag, wherein the detecting of the plurality of tags comprises detecting the at least one first tag, wherein the detecting of the at least one first tag is based on the powering.

9. The apparatus of claim 8, wherein the plurality of tags further comprises at least one second tag, wherein the at least one second tag is comprised in at least one second item of the plurality of items, wherein the at least one second tag comprises at least one energy harvesting device, wherein the at least one energy harvesting device is configured for harvesting energy from at least one external power source for powering the at least one second tag, wherein the detecting of the plurality of tags comprises detecting the at least one second tag, wherein the detecting of the at least one second tag is based on the powering of the at least one second tag.

10. The apparatus of claim 1 further comprising at least one holder configured for securing at least one of the plurality of tags comprised in at least one of the plurality of items.

11. The apparatus of claim 10, wherein the at least one holder is configured to be attached to at least one surface of at least one object using at least one attaching element.

12. The apparatus of claim 1, wherein the at least one data comprises a list of registered identifiers, a list of item identifiers of a list of items corresponding to the list of identifiers, and a list of user identifiers of a list of users corresponding to the list of items, wherein the analyzing comprises matching the identifier of each of the plurality of tags associated with the plurality of items, wherein the determining of the anomaly is further based on the matching.

13. The apparatus of claim 1, wherein each of the plurality of items is a physical form of each of a plurality of documents associated with the user, wherein the establishing of the compliance is based on the plurality of documents, wherein each of the plurality of items is configured for comprising each of the plurality of tags.

14. An apparatus for facilitating a compliance with requirements for users, the apparatus comprising:
a plurality of tags configured to be comprised in a plurality of items associated with a user, wherein the plurality of tags is associated with a plurality of identifiers, wherein the plurality of tags is configured for establishing the compliance with at least one requirement for the user; and
at least one compliance monitoring device comprising:
at least one detector configured for detecting the plurality of tags;
a processing device communicatively coupled with the at least one detector, wherein the processing device is configured for:
obtaining an identifier associated with each of the plurality of tags based on the detecting, wherein the identifier is unique to each of the plurality of tags;
obtaining at least one data;
analyzing the at least one data and the identifier of each of the plurality of tags based on the at least one requirement;
determining an anomaly in the establishing of the compliance with the at least one requirement based on the analyzing of the at least one data and the identifier; and
generating at least one notification based on the determining of the anomaly; and
a communication device communicatively coupled with the processing device, wherein the communication device is configured for transmitting the at least one notification to at least one device.

15. The apparatus of claim 14, wherein each of the plurality of tags comprises an electromagnetic (EM) wave-emitting device, wherein the EM wave-emitting device is configured for emitting first electromagnetic waves with at least one first electromagnetic wave characteristic, wherein the at least one detector comprises at least one electromagnetic (EM) wave-receiving device, wherein the at least one EM wave-receiving device is configured for receiving the first electromagnetic waves based on the emitting of the first electromagnetic waves, wherein the detecting of the plurality of tags is based on the receiving of the first electromagnetic waves.

16. The apparatus of claim 15, wherein the at least one detector further comprises at least one first electromagnetic (EM) wave-emitting device, wherein the at least one first EM wave-emitting device is configured for emitting second electromagnetic waves with at least one second electromagnetic characteristic, wherein at least one of the plurality of tags comprises at least one first electromagnetic (EM) wave-receiving device, wherein the at least one first EM wave-receiving device is configured for receiving the second electromagnetic waves based on the emitting of the second electromagnetic waves, wherein the emitting of the first electromagnetic waves by the EM wave-emitting device of at least one of the plurality of tags is further based on the receiving of the second electromagnetic waves.

17. The apparatus of claim 15, wherein the processing device is further configured for translating the at least one first electromagnetic wave characteristic of the first electromagnetic waves by the EM wave-emitting device of each of the plurality of tags, wherein the obtaining of the identifier associated with each of the plurality of tags is further based on the translating.

18. The apparatus of claim 14, wherein the at least one data comprises a list of registered identifiers, a list of item identifiers of a list of items corresponding to the list of identifiers, and a list of user identifiers of a list of users corresponding to the list of items, wherein the analyzing comprises matching the identifier of each of the plurality of tags associated with the plurality of items, wherein the determining of the anomaly is further based on the matching.

19. The apparatus of claim 14, wherein each of the plurality of items is a physical form of each of a plurality of documents associated with the user, wherein the establishing of the compliance is based on the plurality of documents, wherein each of the plurality of items is configured for comprising each of the plurality of tags.

20. An apparatus for facilitating a compliance with requirements for users, the apparatus comprising:
- a plurality of tags configured to be comprised in a plurality of items associated with a user, wherein the plurality of tags is associated with a plurality of identifiers, wherein the plurality of tags is configured for establishing the compliance with at least one requirement for the user, wherein each of the plurality of items is a physical form of each of a plurality of documents associated with the user, wherein the establishing of the compliance is based on the plurality of documents, wherein each of the plurality of items is configured for comprising each of the plurality of tags; and
- at least one compliance monitoring device comprising:
  - at least one detector configured for detecting the plurality of tags;
  - a processing device communicatively coupled with the at least one detector, wherein the processing device is configured for:
    - obtaining an identifier associated with each of the plurality of tags based on the detecting, wherein the identifier is unique to each of the plurality of tags;
    - obtaining at least one data;
    - analyzing the at least one data and the identifier of each of the plurality of tags based on the at least one requirement;
    - determining an anomaly in the establishing of the compliance with the at least one requirement based on the analyzing of the at least one data and the identifier; and
    - generating at least one notification based on the determining of the anomaly; and
  - a communication device communicatively coupled with the processing device, wherein the communication device is configured for transmitting the at least one notification to at least one device.

* * * * *